Dec. 12, 1939.   A. B. FIELDS   2,183,066
TWO-WHEEL HAND CART
Filed Feb. 9, 1938
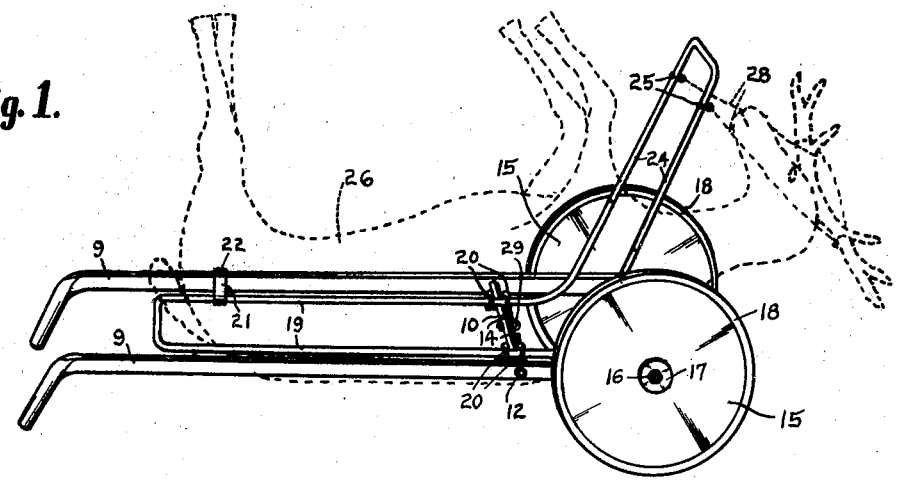
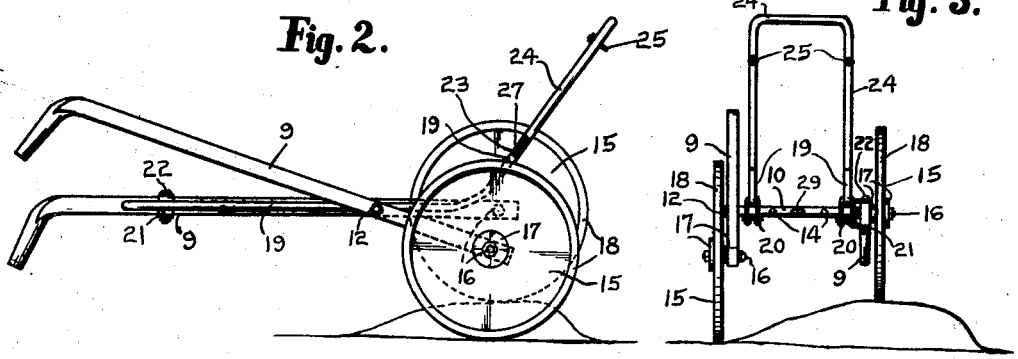
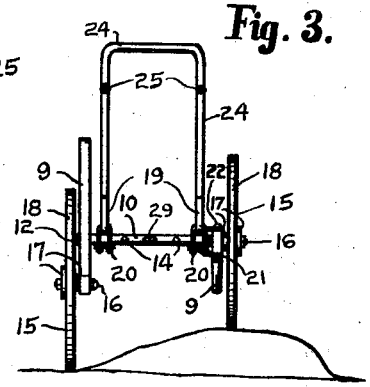
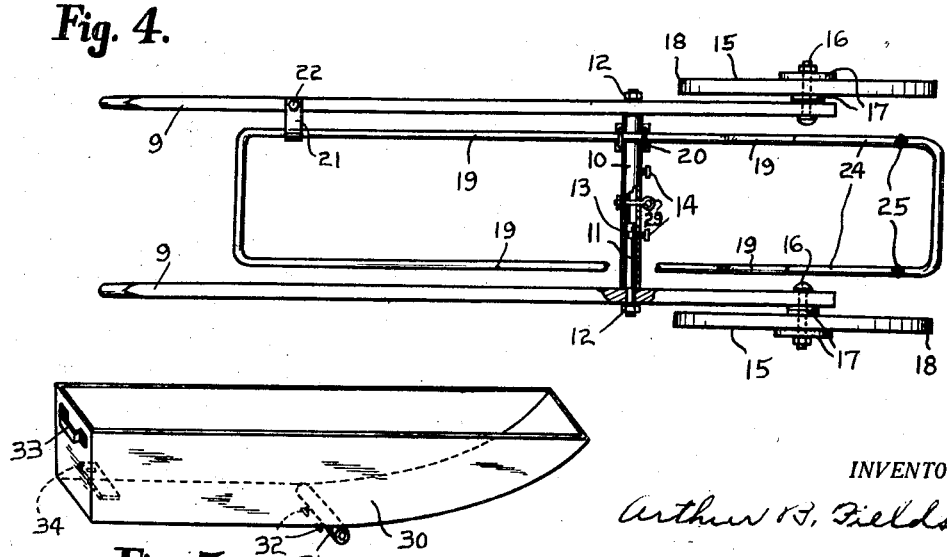
INVENTOR.
Arthur B. Fields Patented Dec. 12, 1939

2,183,066

UNITED STATES PATENT OFFICE 2,183,066

TWO-WHEEL HAND CART

Arthur B. Fields, Portland, Oreg.

Application February 9, 1938, Serial No. 189,514

3 Claims. (Cl. 280—53)

This invention relates to improvements in trucks, and especially in hand trucks or carts capable of a variety of uses, such as transportation of various loads as sand, gravel, concrete, wood, dirt or sawdust, and more especially adapted for hauling deer or other large game from hunting grounds to camp or car, and is further adapted for hauling camp outfits, forest fire fighting equipment, and supplies on mountain trails or over similar rough terrain.

The principal object of the invention is to provide a two wheeled hand truck or cart that is so constructed as to maintain a level base position of the load in respect to the carrier while traveling over rough or uneven surfaces. This object is attained by pivoting the carrier frame and handle bars to an axle shaft and securing in spaced relation thereto the wheels of the vehicle by means of separate axle shafts adjacent one end of the handle bars, thus allowing each wheel to be independently controlled for vertical movements, this in turn resulting in controlled horizontal and vertical movements of the vehicle load.

Another object of the invention is to provide a hand truck or cart that is light in weight, yet durable and strong in construction, and one capable of being quickly assembled or disassembled to facilitate transporting in restricted carrier space.

Other objects and advantages of the invention will be apparent from the following descriptions of the figures shown in the accompanying drawing wherein:

Figure 1 is a perspective view of the hand truck as adapted to carry a deer or similar load; Figure 2 is a side elevation view illustrating the independent operation of the handle bars and wheels; Figure 3 is a front elevation of Figure 2; Figure 4 is a top plan view with portions cut away to more clearly show certain axle construction features; Figure 5 is a perspective view of a box carrier to be substituted for the carrier frame when loose loads are desired to be carried.

The hand truck or cart consists of two side bars or handles 9 which are pivotally connected to the tubular axle 10 as best shown in Figure 4, by means of stub axles 11 bolted to the handle bars 9 as shown by the nuts 12. The stub axles 11 at their inner extremities are provided with an annular groove 13 wherein a set screw 14 is engaged and serves to rotatably retain the axle stub within the tubular axle 10. The foregoing construction permits of quick and easy assembling or disassembling.

At one extremity of the handle bars 9 are secured the wheels 15 by means of stub axles 16 thru suitable bearings 17. The wheels 15 are further provided with suitable tires 18.

In Figures 1, 2, 3, and 4 the carrier frame 19 is shown suitably secured to the tubular axle 10 by means of tie-bolts 20. The carrier frame 19 is further secured to one of the handle bars 9 by means of the clamp 21, which is bolted or similarly secured to the handle 9 by the removable fastener 22. The carrier frame 19 terminates in upwardly disposed prongs 23 as best shown in Figure 2, these prongs 23 being adapted to snugly receive the socketed U member 24, to which are secured eye bolts 25. From this construction it is evident upon inspection of Figures 2 and 3 that the carrier frame 19 is maintained at the desired load level by means of manipulation of the handle bar 9 to which the carrier frame 19 is secured by the clamp 21. Suitable manipulation of the opposing handle bar 9 will permit the carrying of any load in a vertically and horizontally stabilized manner over rough or uneven surfaces.

To secure a load such as a deer 26, shown in dotted lines in Figure 1, to the frame 19 the socketed U member 24 is removed from the prongs 23 of the frame 19 and the deer or similar carcass or load is positioned on the frame 19 with the neck or small portion thereof between the upturned prongs of the frame 19. The socketed U member 24 is then placed about the small portion of the load and is replaced upon the frame 19 by means of the sockets 27 and prongs 23. The eye bolts 25 are utilized for the purpose of securing the load, or load overhang to the U member 24 of the frame 19 as by means of rope or the like indicated by the numeral 28. The tubular axle 10 is further provided with an eye bolt 29 which may be utilized for the purpose of attaching a rope to assist in carrying a heavy load over rough or steep surfaces.

In Figure 5 is illustrated a carrier 30 for the transportation of loose loads such as sand, gravel, concrete, sawdust, etc., over uneven or rough surfaces. The carrier is provided with a tubular axle 31 together with the set screws 32 and dumping handle 33 together with the latch plate or clamp arm 34 for securing same to handle bar 9. Manipulation of the handle bars 9 maintain the load level under varying road conditions.

I do not desire to restrict myself to the particular form or arrangement of the parts herein shown and described, since it is apparent that they may be changed and modified without departing from the spirit of my invention.

What I claim as new and desire to secure by Letters Patent of the United States, is—

1. A truck having handle bars, an axle pivotally connecting said handle bars, a wheel affixed to each handle bar adjacent one end thereof and in spaced apart relation to said axle, a load carrying frame secured to said axle and to one of said handle bars, said frame including a removable U shaped member for securing said load, each said handle bar being capable of individual manipulation for maintaining the load level under varying road conditions.

2. A truck having a pair of handle bars, a hand grip on one end of each of said handle bars for propelling said truck, a wheel on the opposite end of each of said handle bars, an axle pivotally connecting said handle bars intermediate their ends, a load-carrying means on said axle and removably secured to one of said handle bars, said other handle bar having free pivotal motion about said axle and said load-carrying means so that one of said wheels may be raised or lowered by means of one of said hand grips while said truck is being propelled by said hand grips.

3. A truck having a pair of handle bars, a hand grip on one end of each handle bar for propelling said truck, a wheel on the opposite end of each of said handle bars, an axle pivotally connecting said handle bars intermediate their ends, a load-carrying frame attached to said axle so as to have free pivotal movement with respect to both of said handle bars, clamping means on one of said handle bars for locking engagement with said frame, said other handle bar having unrestrained pivotal movement at all times so that its wheel may be raised or lowered by manipulation of its hand grip while said truck is being propelled.

ARTHUR B. FIELDS.